United States Patent [19]

Araya et al.

[11] 4,094,515
[45] June 13, 1978

[54] SEAL DEVICE IN A ROLLER CHAIN

[76] Inventors: Kumakichi Araya, No. 2, Daishoji Seki-machi, Kaga-shi, Ishikawa-ken; Junichi Motoya, I-13, Diashoji Honmachi, Kaga-shi, Ishikawa-ken, both of Japan

[21] Appl. No.: 766,678

[22] Filed: Feb. 8, 1977

[30] Foreign Application Priority Data

Feb. 20, 1976 Japan ................................ 51-18280
Feb. 20, 1976 Japan ................................ 51-18281

[51] Int. Cl.² ........................ F16J 15/34; B62D 55/00
[52] U.S. Cl. ........................................ 277/92; 74/257; 277/206 A; 305/11
[58] Field of Search ................... 277/83, 92, 206.1; 74/257, 251 S; 305/11, 14

[56] References Cited

U.S. PATENT DOCUMENTS

| 2,974,646 | 3/1961 | Miller et al. | 277/206.1 |
| 3,180,165 | 4/1965 | Bain | 74/257 |
| 3,347,556 | 10/1967 | Fleckenstein | 277/206.1 |
| 3,542,380 | 11/1970 | Klein et al. | 277/206.1 |
| 3,622,168 | 11/1971 | Woodling | 277/206.1 |
| 3,948,574 | 4/1976 | Baylor | 277/92 |
| 3,958,836 | 5/1976 | Brown | 74/257 |

*Primary Examiner*—Robert I. Smith
*Attorney, Agent, or Firm*—Stevens, Davis, Miller & Mosher

[57] ABSTRACT

A seal device in a roller chain characterized in that an annular body rich in rubber-like elasticity of substantially X-letter or Y-letter section formed with square lips in an outer peripheral edge portion of a base portion thereof is interposed between a roller link plate and a pin link plate, said lips being pressed against the pin in inner and outer directions.

3 Claims, 12 Drawing Figures

SEAL DEVICE IN A ROLLER CHAIN

DESCRIPTION OF THE PRIOR ART

Conventional roller chains will now be described with reference to FIGS. 1 to 5 of the drawings. Referring first to FIG. 1, there is shown an endless roller chain A composed of a roller link Ra with a roller 3 rotatably fitted in an outer peripheral surface of a bushing 2 whose ends are received and secured to a pair of opposed roller link plates 1, 1, respectively, and a pin link Pa comprising pin link plates 4, 4 along the outside of the roller link plates 1, 1 and a pin 5 whose ends are received and caulked at the plates 4, 4, said pin extending through the bushing 2, and the roller chain A is stretched and extended over a pair of chain wheels (not shown) spaced apart for accomplishment of power transmission. Since the bushing 2 and the pin 5 form important bearing portions when the roller chain A is bended, the bushing 2 is internally filled with grease-like lubricating oil at the time of assembling the roller chain A to place it in a state where a clearance formed between the bushing and the pin 5 is filled with oil. However, under the present conditions in which the roller chain A is used extremely severely, the lubricating oil is heated into a liquid phase due to repeated bending motion of the roller chain, and on the other hand, vibration and pulsation unavoidably produced when the roller chain A is driven exert a centrifugal force on the roller chain A itself, as a consequence of which the lubricating oil thus heated into the liquid phase runs out and scatters externally of the bushing 2. As a result, the bearing portions will interiorly be a non-lubrication state while the lubricating oil merely adhered to inner and outer surfaces of the bushing 2 or pin 5 will result in an early deterioration in lubricating function due to heat generation resulted from driving of the roller chain A. In addition, particularly in the case where the roller chain A is driven in an atmosphere in which for example, powder and dust scatter, hard fine dust entered between the roller link plate 1 and the pin link plate 4 gradually enter the bearing portions to wear and damage the bushing 2 and the pin 5. As previously mentioned, in either case of non-lubrication or severe using condition, an initial elongation is appeared in the roller chain A. FIG. 2 shows a roller chain B which is designed to prevent scattering of lubricating oil in all directions due to the centrifugal force and entry of dust such as fine powder and dust into the bearing portions. That is, in the structure similar to that shown in FIG. 1, a roller link Rb, which comprises roller link plates 11, 11, a bushing 12 and a roller 13, and a pin link Pb, which comprises a pin link plate 14 and a pin 15, are bendably connected in an endless fashion, and an O-ring H of a circular section as seen in FIG. 4 having a rubber-like elasticity is held in a portion of clearance S between the roller link plate 11 and the pin link plate 14 and fitted in the outer peripheral surface of the pin 15 to form the roller chain B. Since the inside diameter Di of the O-ring H and the outside diameter Do of the pin 15 are substantially the same, the greater the crushing allowance of the O-ring H as shown in FIGS. 2 and 5 relative to the diameter $d$ of the circular section, the greater will be the sealing function. However, the O-ring H acts so as to resist the holding force of the roller link plate 11 and the pin link plate 14 owing to a force of the O-ring to return to its original configuration due to the elasticity. Further, since the portion of circular section is formed into a flattened ellipse, area and pressure resulted from mutual contact between the roller link plate 11, the pin link plate 14 and the O-ring H increase to thereby increase the frictional resistance as the characteristic of the rubber-like material. For this reason, the resistance of the roller chain B when bended increases so that a power loss required to drive the roller chain B increases. However, the early elongation of the roller chain B is reduced by the arrangement to prevent entry of dust into the bearing portions and to prevent scattering of grease-like lubricating oil from the bearing portions, and in this respect, the roller chain B is an improvement to the roller chain A. As previously mentioned, however, the increase in resistance when bended results in wear and damage of the O-ring itself, and notwithstanding the wear and damage occur at a fixed side (for example, at the upper or lower side in FIG. 2) of the O-ring H in each bended portion, the roller link Rb is moved to one side by being biased towards the worn and damaged O-ring H by the presence of the O-ring H not yet worn and damaged, or when both the opposite O-rings H are broken, the roller link Rb unnecessarily oscillates within the pin link Pb, which results in an unsmooth engagement with the chain wheels and exertion of unnecessary torque or reaction force on the pin 15, thus breaking the pin 15. On the other hand, if the crushing allowance of the O-ring H is small, unnecessary voids are produced in the clearance S portion, and as a result, prevention of entry of dust, maintenance of lubricating oil, and the like may not sufficiently be achieved to lower the function as the roller chain. Thus, the prior art roller chains have various disadvantages as noted above.

SUMMARY OF THE INVENTION

This invention is characterized in that an annular body rich in rubber-like elasticity of substantially X-letter or Y-letter section formed with square lips in an outer peripheral edge portion of a base portion thereof is held between a roller link plate and a pin link plate, the lips being pressed and deformed in inner and outer directions so as to come into close contact with the pin.

It is a primary object of this invention is to provide a seal device in a roller chain in which square lips in an annular body rich in rubber-like elasticity are pressed against a pin or a bushing in inner and outer directions to thereby enable preventing leak of lubricating oil filled between the pin and the bushing while preventing entry of dust.

It is another object of this invention to provide a seal device in a roller chain which can prevent an increase in frictional resistance produced when bended and avoid wear and breakage of an annular body composed of a rubber-like resilient body.

It is a further object of this invention to provide a seal device in a roller chain which produces no noise and pulsation during use and rarely produces an elongation resulted from wear.

DETAILED DESCRIPTION OF THE INVENTION

Figure 6:
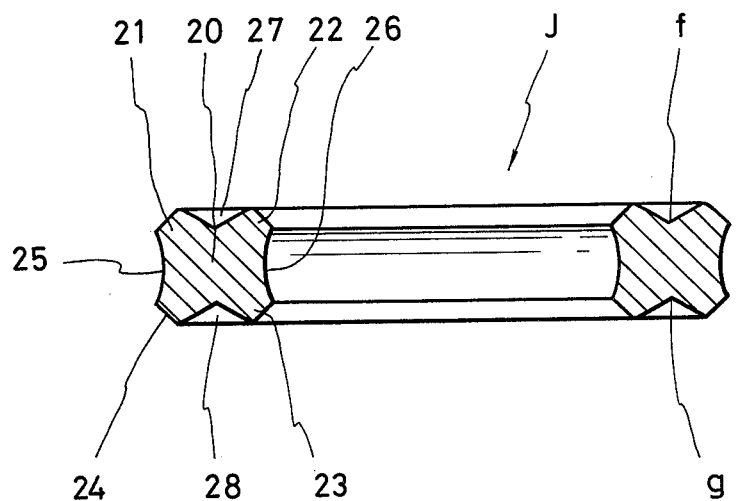
FIG. 6 is a sectional view of a seal member in accordance with this invention.

This invention will now be described by way of embodiments referring to FIGS. 6 to 10. Referring first to FIG. 6 showing a seal member, there is shown an X-ring J composed of an annular body rich in rubber-like elasticity consecutively integrated into substantially X-letter section wherein a base portion 20 is formed in its outer peripheral edge portion with lips 21, 22, 23 and 24, the lips 21, 24 and 22, 23 being provided with side walls 25, 26, respectively, having a given radius therebetween, the lips 21, 22 and 23, 24 being provided with triangularly cut concave portions 27, 28, respectively, therebetween, the concave portions 27, 28 having their depth controlled so that the outer surface (the surface opposite to the roller 13) and the inner surface of roller link plate 11 and pin link plate 14 will not come into contact with roots $f$, $g$. When this X-ring J is held, for example, between the roller link plate 11 and the pin link plate 14 shown in FIG. 2 while being fitted around the pin 15, (the lips 21, 22 are faced with the roller link plate 11), the lips 21, 22 are pressed along the outer surface of the roller link plate 11 (the surface opposite to the pin link plate 14). As a consequence, the lip 21 is deformed and enlarged outwardly relative to the pin 15 whereas the lip 22 deformed and enlarged inwardly relative to the pin 15. On the other hand, when the lips 23, 24 face with the side of the pin link plate 14, the lip 23 is deformed and enlarged inwardly relative to the pin 15 whereas the lip 24 deformed and enlarged outwardly relative to the pin 15 to decrease the depth of the concave portions 27, 28, as a consequence of which the lips 21, 22, 23 and 24 act as if a free end of a cantilever about the base portion 20. In this case, the lips 21, 22 come into close contact with the inner surface of the pin link plate 14 (the surface adjacent to the roller 13) whereas the lips 23, 24 come into close contact with the outer surface of the roller link plate 11, and in addition, they are deformed and followed because of their elasticity even when the roller chain bended to produce no clearance between the bushing 12 and the pin 15. Moreover, since the inner and outer peripheral surfaces 26, 25 are in the form of a bay-like surface of a given radius, they serve as a storing portion for leaking lubricating oil to prevent the lubricating oil from being leaked. For the sake of convenience, the roller chain with the X-ring J mounted thereon is referred to as "C".

Figure 1:
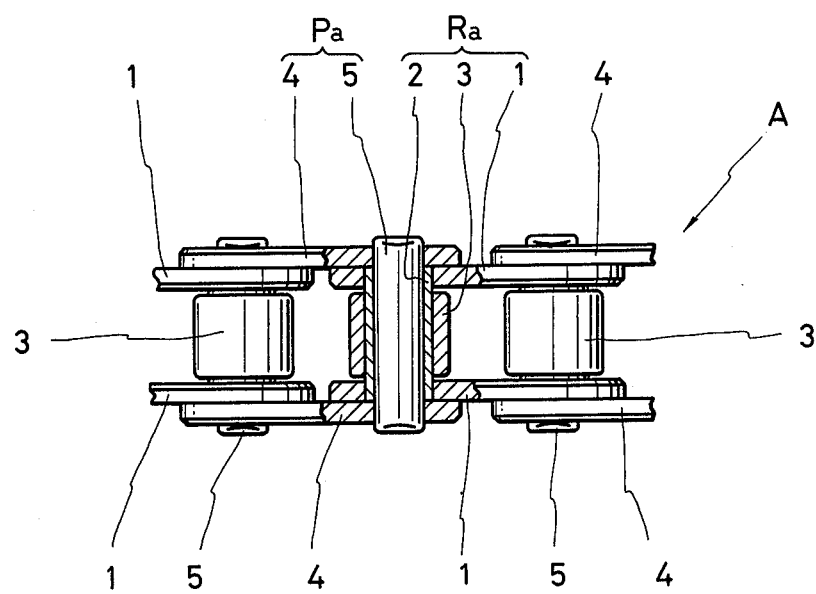
FIG. 1 is a partially cutaway plan view of a conventional roller chain.
Figure 2:
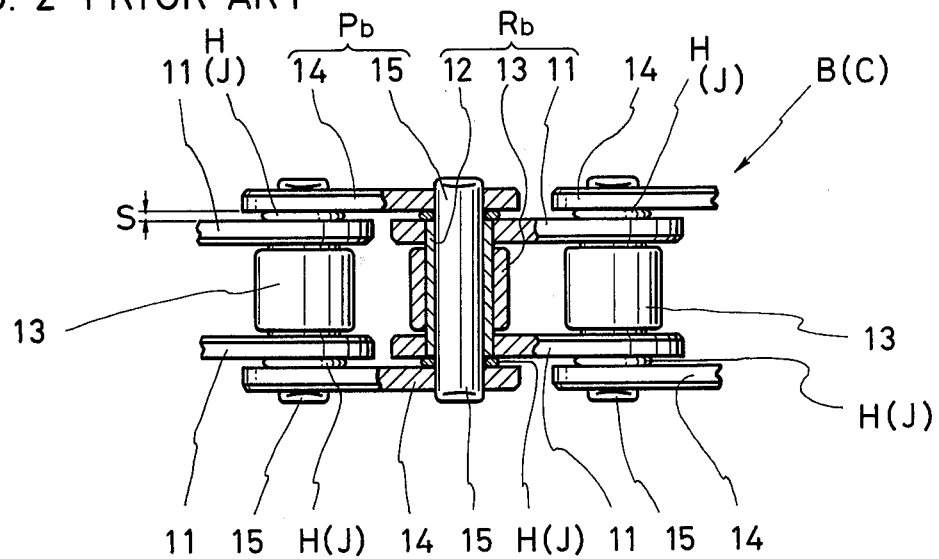
FIG. 2 is a partially cutaway plan view of an improved form of the roller chain shown in FIG. 1.
Figure 3:
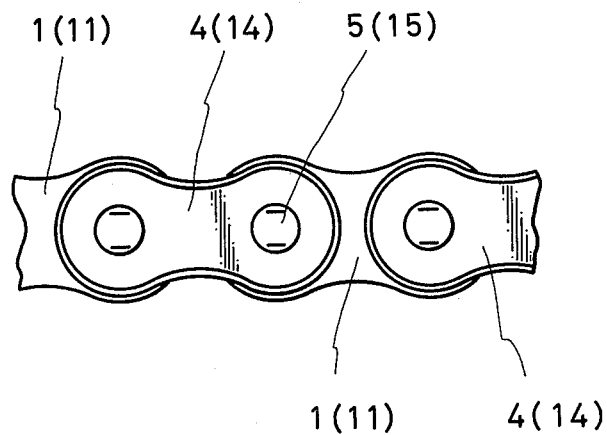
FIG. 3 is a front view of parts shown in FIGS. 1 and 2.
Figure 4:
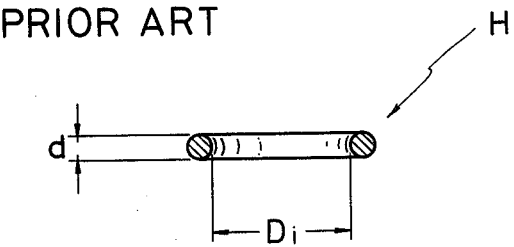
FIG. 4 is an enlarged sectional view of an O-ring of FIG. 2 in its original form.
Figure 5:
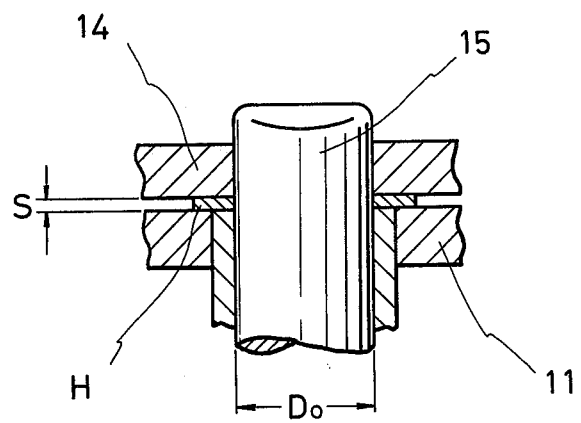
FIG. 5 is a partially enlarged sectional view of the O-ring of FIG. 2 in a state where it is held.
Figure 7:
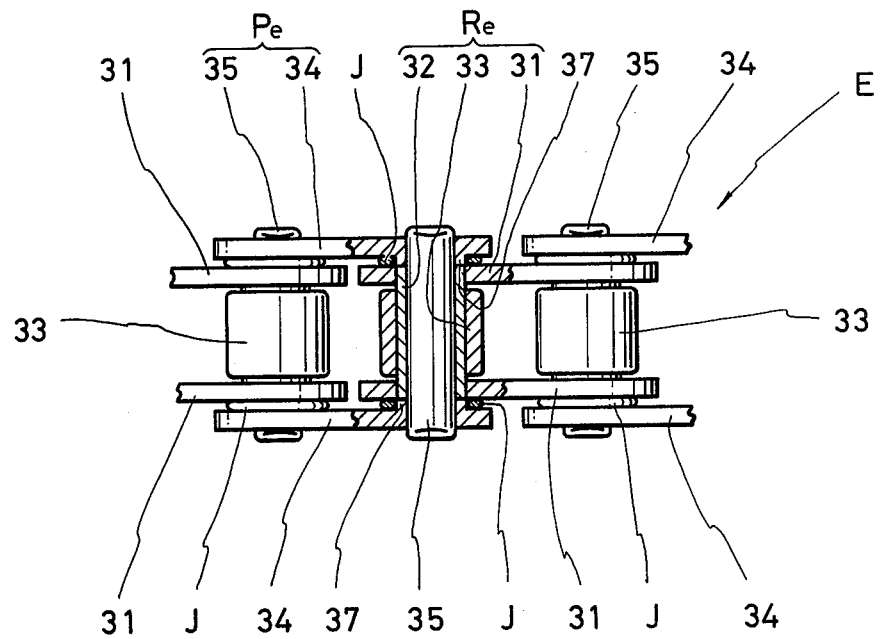
FIG. 7 is a partially cutaway plan view of a roller chain with the seal member of FIG. 6 mounted thereon.
Figure 8:
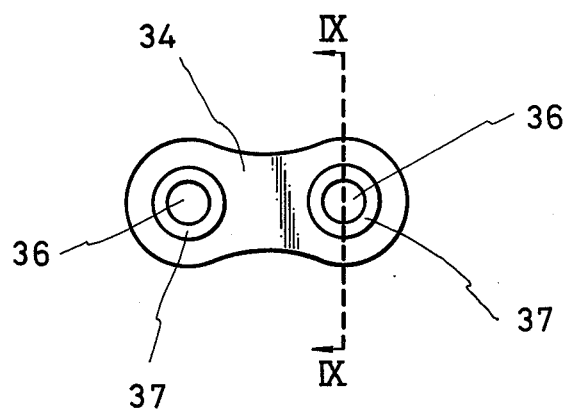
FIG. 8 is a front view of a pin link plate of FIG. 7.
Figure 9:
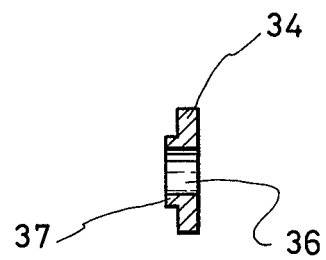
FIG. 9 is a sectional view taken along line IX—IX of FIG. 8.

Turning now to FIG. 7, there is shown an endless roller chain E, which is similar in structure to that of the roller chains A and B shown in FIGS. 1 and 2, composed of a roller link Re with a roller 33 rotatably fitted in an outer peripheral surface of a bushing 32 whose ends are received and secured to a pair of opposed roller link plates 31, 31, respectively, and a pin link Pe comprising pin link plates 34, 34 along the outside of the roller link plates 31, 31 and a pin 35 whose ends are received and caulked at the plates 34, 34, the pin extending through the bushing 32. In this particular arrangement, projected portions 37, 37 are integrally formed in peripheral edges of holes 36, 36 on one side of the pin link plate 34 so as to come into contact with surfaces opposite to the roller link plate 31 and the roller 33, and the annular X-ring J shown in FIG. 6 is fitted in the outer peripheral surface of the projected portion 37, the projected portion 37 having its height corresponding to the above-mentioned clearance S including the crushing allowance relative to the thickness of the X-ring J.

Figure 10:
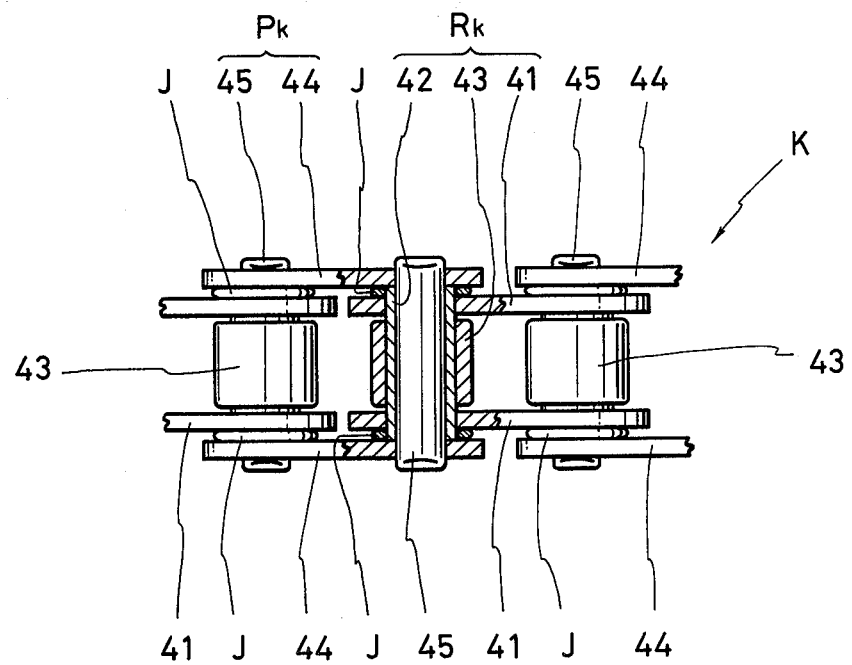
FIG. 10 is a partially cutaway plan view of a roller chain when a lengthy bushing is used.

In FIG. 10, further, there is shown a roller chain K in which a lengthy bushing 42, whose ends come into contact with flat plate-like pin link plates 44 similar to those shown in FIGS. 1 and 2, is fitted and projected from roller link plates 41, and the X-ring J as shown in FIG. 6 is fitted in the outer peripheral surface of the lengthy bushing 42 between the roller link plate 41 and the pin link plate 44. In the figure, the reference numeral 43 designates a roller, 45 a pin, Rk a roller link, and Pk a pin link.

Figure 11:
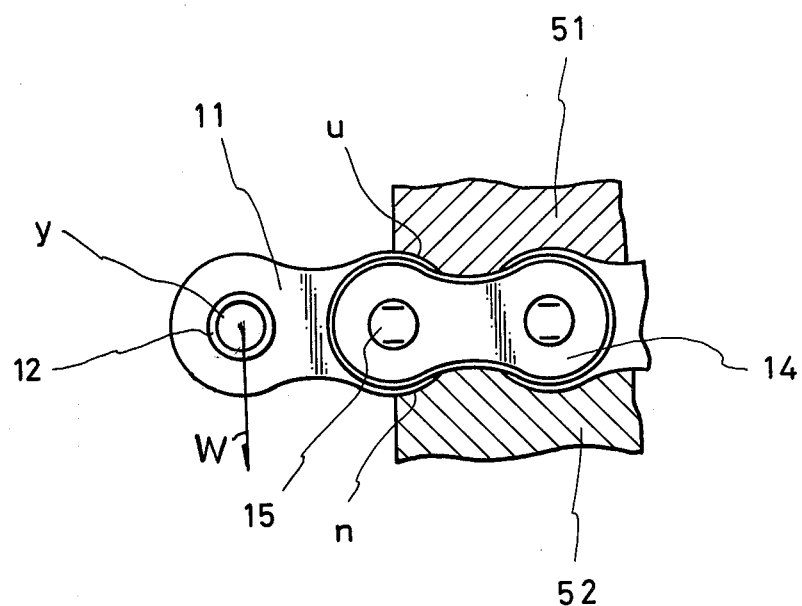
FIG. 11 is a sectional view of a principal part showing the testing condition of the roller chain when bended.

Roller chains B, C, and E were subjected to bending test in a procedure shown in FIG. 11. (In the figure, only the roller chain B is shown.) That is, the roller chain C (the same procedure will apply to the roller chains B and E, and therefore, a description therefor will be omitted) is gripped and fixed by upper die 51 and lower die 52 or vice (not shown), and a small play (not shown) is formed in upper side $u$ and lower side $n$ of the upper die 51 so that the roller link plate 11 may be rotated. Under these conditions, a spring balance not shown is placed on the bore $y$ in the bushing 12 and a tension load W is applied in the direction as indicated by the arrow to bend the roller chain C to produce a stress, which was measured by the spring balance. In the X-ring J, the Shore hardness used at that time was Hs = 70 – 80, and the crushing allowance was set to 25 – 40%. The minimal values and maximal values of bending torque in the roller chain B and C and E were measured at 230 g, 60 g and 340 g, 100 g, respectively. It will easily be understood from the foregoing that in the bending test, the roller chains C and E are better in bending resistance than the roller chain B.

Figure 12:
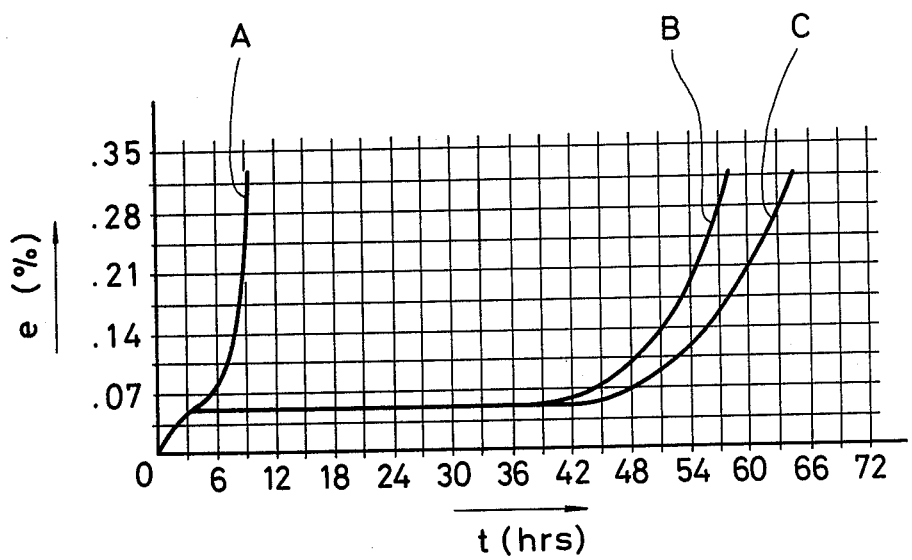
FIG. 12 is a graphic representation showing the relationship between the driving time and wear and elongation of three different roller chains in the prior art and the present invention.

On the other hand, the roller chains A, B, and C were subjected to assembling experiment as a roller chain of #60 provided in JIS (Japanese Industrial Standard), and the results obtained by measuring the relationship between the driving time and wear and elongation in the experiment are graphically shown in FIG. 12. The conditions of measurement are as follows:

| Machine used | 100 HD water power meter |
|---|---|
| The number of teeth of a pair of chain wheels | 15 |
| Revolutions per minute of the chain wheel | 2,600 |
| Running speed per minute of roller chain | 750 m |
| Tension of the same | 160 kg |
| Load horse power | 27 hp |

In FIG. 12, the axis of ordinate indicates the rate of wear and elongation to the initial length of the roller chains A, B, and C when measured converted into % (e) every measuring time (every 3-hour in this example), and the axis of abscissa indicates the driving time (t), at the experiment conducted under the above-mentioned conditions. As will be understood from FIG. 12, in the roller chains A, B, and C, their initial elongation is indicated at $e \approx 0.05\%$ and time at $t = 3$ hours at the beginning of drive. However, thereafter, in the roller chain A the rate e rapidly rises linearly at $t = 9$ hours, which indicates a great wear and elongation; in the roller chain B, the rate e is slower than that of the roller chain A after a lapse of $t = 40$ hours but gradually rises; and in the roller chain C, the rate e is slower than that of the roller chain B after a lapse of $t = 45$ hours. When the wear and elongation in these roller chains A, B, and C reached approximately $e = 0.28\%$, the roller chains were disassembled. Then, the bearing portion composed of bushings 2, 12 and pins 5, 15, the condition of grease-like lubricating oil, and the O-ring H and X-ring J held as the seal member were checked. As a result therefrom, it has been found in the roller chain A that it worn out to a degree that the pin 5 and the bushing 2 are brought into overall contact with each other to form a rusted film. As for the roller chain B, it has been found that the O-ring H begun to occur one to three breakages in $t = 36 - 39$ and completely broken at three to five parts in $t = 39 - 42$ hours, finally more than half of them being in a state of breakage or close thereto. The bearing portion subjected to such breakage is almost same as the broken state of the bearing portion in the above-mentioned roller chain A whereas the bearing portion not broken has lubricating oil in the form of solid and powder. In terms of wear, however, it is not to a degree that the bushing and the pin 15 are brought into overall contact with each other to find no rusted film. When the roller chain C is disassembled, no breakage has been found in the X-ring J itself even in the driving for a period of $t \approx 63$ hours but the lips 21, 22, 23 and 24 have merely been plucked partially to such a degree so as not to ruin a configuration of the X-ring J. It has also been found that grease-like lubricating oil was formed into solid and powder within the bearing portion but no wear in the bushing 12 and the pin 15 has almost been found. Besides, the bushing and the pin 15 in the bearing portion, which requires filling the lubricating oil, have been worn to a degree that they were brought into overall contact with each other, but about half of test pieces were not worn in the state of rust. It will be understood from the foregoing that in terms of maintenance of lubricating oil and wear proof of the bearing portion composed of the bushing and the pin, the roller chain B is better than the roller chain A, and the roller chain C is better than the roller chain B.

The present invention has various advantages noted below. The projected portion 37 may be formed integral with the pin link plate 34 as seen in FIG. 7 or the lengthy bushing 42 may be used as seen in FIG. 10, thereby decreasing a possible shearing of pins 35 and 45. On the other hand, the crushing allowance of the X-ring J may be made constant to thereby enhance strength of the entire roller chains E and K and to avoid possible rotation of the pins 35 and 45 themselves for a long period of time. In addition, due to the specific character of the X-ring J as the rubber-like resilient body, it may be placed in intimate contact with the outer peripheral surface of the projected portion 37 or the lengthy bushing 42 to prevent an unexpected creation of a clearance for a better achievement of function in maintenance of lubricating oil and in preventing entry of dust. Moreover, the noises and pulsations produced in the roller chain during its running may effectively be avoided to effect power transmission in quiet.

While the rings of substantially X-letter section have been described in the foregoing embodiments, it is to be understood that so-called Y-ring, K-ring or W-ring provided with lips at least on three sides such as Y-letter, K-letter or W-letter section may also be used. Since such a modified ring has its function and effect similar to those of the X-ring J, no particular description and illustration will be given thereof.

What is claimed is:

1. A seal device in a roller chain comprising an annular body rich in rubber-like elasticity having square lips in an outer peripheral edge portion of a base portion thereof and having one surface formed into a substantially X-letter cross section between said lips by a triangular concave portion and curved side walls, a pin link plate for holding and securing said annular body in opposed relation with a roller link plate, and a pin received into said pin link plate, said pin having ends caulked, characterized in that said lips are inwardly and outwardly pressed against said pin into slight contact with said roller link plate and said pin link plate, and as the chain travels, said lips are further brought into intimate contact with said roller link plate and said pin link plate by means of deformation of the side walls to prevent leakage of lubricating oil in the peripheral edge of the pin or to prevent entry of dirt.

2. A seal device in a roller chain comprising an annular body rich in rubber-like elasticity having square lips in an outer peripheral edge portion of a base portion thereof and having one surface formed into a substantially X-letter cross section between said lips by a triangular concave portion and curved side walls, a pin link plate having a projection internally projected with said annular body received and brought into intimate contact with the outer peripheral surface, a roller link plate for holding and allowing said pin link plate and said annular body to come into intimate contact with each other, a bushing having an end received and secured to said roller link plate, said end having its foremost end surface which forms the same surface as the outer surface of the roller link plate, said foremost end surface being brought into intimate contact with said projection, and a pin loosely received in said bushing and having ends received and caulked in said pin link plate, characterized in that said lips are inwardly and outwardly pressed against said pin into contact with said roller link plate and said pin link plate, and as the chain travels, said lips are brought into intimate contact with respective plates by means of deformation of the side walls to prevent leakage of lubricating oil between said bushing and said pin and to prevent entry of dirt.

3. A seal device in a roller chain comprising an annular body rich in rubber-like elasticity having square lips in an outer peripheral edge portion of a base portion thereof and having one surface formed into a substantially X-letter cross section between said lips by a triangular concave portion and curved side walls, a lengthy bushing with said annular body received and placed in intimate contact with an outer peripheral surface of the end thereof, a pin link plate whose inner surface comes into contact with an end surface along the length of said lengthy bushing, a pin whose end is received and caulked in said pin link plate and loosely received in said lengthy bushing, and a roller link plate arranged in parallel to said pin link plate and having said lengthy bushing received and secured somewhat internally of the end thereof, said annular body being held between said roller link plate and said pin link plate, characterized in that said lips are inwardly and outwardly pressed against said pin into contact with the outer surface of said roller link plate and the inner surface of said pin link plate, and as the chain travels, said lips are brought into intimate contact with respective plates by means of deformation of the side walls to prevent leakage of lubricating oil between said lengthy bushing and said pin and to prevent entry of dirt.

* * * * *